United States Patent [19]

Bremer

[11] Patent Number: 5,081,647
[45] Date of Patent: Jan. 14, 1992

[54] COMMUNICATION OF A VOICE SIGNAL VIA CONTINUOUS QUADRATURE AMPLITUDE MODULATOR

[75] Inventor: Gordon Bremer, Clearwater, Fla.

[73] Assignee: American Telephone & Telegraph Company, New York, N.Y.

[21] Appl. No.: 294,167

[22] Filed: Jan. 6, 1989

[51] Int. Cl.⁵ .................................... H04L 27/34
[52] U.S. Cl. .................................... 375/5; 332/103; 332/115; 375/13; 375/39; 455/60; 455/93
[58] Field of Search ................. 375/38, 39, 24, 41, 375/15, 43, 61, 77, 5, 13; 332/103, 104, 115, 167, 177, 183, 184; 455/60, 46, 47, 93

[56] References Cited

U.S. PATENT DOCUMENTS 3,795,865  3/1974  Armstrong ........................ 375/43
4,028,626  6/1977  Motley et al. .................... 375/43
4,398,062  8/1983  McRae et al. .................... 375/15

Primary Examiner—Bendict V. Safourek
Attorney, Agent, or Firm—Kane, Dalsimer, Sullivan, Kurucz, Levy, Eisele and Richard

[57] ABSTRACT

A method and apparatus for communicating a voice conversation over a single telephone channel using continuously variable level quadrature amplitude modulation establishes and maintains two totally independent communication paths, each near perfect in amplitude and phase with respect to frequency over a bandwidth suitable for communication of continuously variable amplitude pulses. These pulses may be representations of any suitable bandlimited analog signal. The method establishes almost flawless QAM channels (real, imaginary), then allows switching to continuously variable amplitude analog transmissions.

7 Claims, 5 Drawing Sheets

COMMUNICATION OF A VOICE SIGNAL VIA CONTINUOUS QUADRATURE AMPLITUDE MODULATOR

BACKGROUND OF THE INVENTION

1. Field of The Invention

The present invention relates to a method and invention for communicating a band limited analog signal such as a voice conversation over a telephone channel by continuously variable level quadrature amplitude modulation through the use of two totally independent communication paths.

2. Description of The Prior Art

Prior art voice communication systems are known, of course, for transmitting analog signals such as voice directly over a communications line such as a telephone channel. Also known are systems in which voice analog signals are digitized with the digital signals then communicated either over an analog channel by use of a data modem or directly over a digital channel. Also known are systems incorporating data modems in which a data signal is quadrature amplitude modulated, converted to analog form, and transmitted over a communications channel such as a telephone line. However, no prior art invention is known which acts on an analog voice signal continuously variable level quadrature modulation to produce two independent analog signals for transmission over an analog communications channel such as a telephone line.

OBJECTIVES AND SUMMARY OF THE INVENTION

It is an objective of the present invention to provide a method and apparatus for communicating a single voice conversation or other analog signal over a single telephone channel using continuously variable level quadrature amplitude modulation and maintaining two independent communication paths for the signal over the channel.

These and other objects and advantages of the invention will become apparent from the following summary.

The present invention provides a method and apparatus for communicating a voice conversation over a telephone channel using continuously variable level quadrature amplitude modulation to establish and maintain two independent communication paths, each near perfect in amplitude and phase with respect to frequency over a band-width suitable for communication of continuously variable amplitude pulses. These pulses may be representations of any suitable band limited analog signal such as a voice conversation.

The method of the present invention comprises a time-domain sampling of an analog signal such as voice, the separation of the sampled signal into two series of continuously variable amplitude pulses, the pulse amplitude shaping of each of the two series of signals, the quadrature amplitude modulation of the shaped analog signals by mixing one of the signals with a carrier frequency and the other of the signals with the carrier frequency which has been offset in phase by 90 degrees, the summing of the two series of signals in an adder, and the transmission thereof on a communications channel such as a telephone line. At the receiver end of the communication channel, the method involves the separation of the two signals by a applying a carrier frequency to each of the signals, the carrier frequency for the respective signals being applied 90 degrees apart, the pulse amplitude demodulation and equalizing of each of the signals, the carrier phase correction of each of the signals, the conversion of each of the signals from sampled data to an analog signal to produce a single voice signal output.

The apparatus of the present invention comprises, in the transmitter circuit, a voice signal analog to sample data converter which produces two separate series of continuously variable amplitude pulses, two pulse amplitude modulation filters for respectively acting on the two series of continuously variable amplitude pulses, a carrier frequency generator, and two mixers for combining outputs of the two pulse amplitude modulation filters respectively with signals from the carrier frequency generator which are separated by 90 degrees, an adder connected to the output of the mixers. A communication channel such as a telephone line is connected to the output of the adder. At the receiver end, the apparatus comprises a carrier frequency generator for applying the carrier frequency at a 90 degree phase to the two signals, a pair of mixers for respectively multiplying the outputs of the carrier frequency generator with the output of the channel, a pair of filters for respectively removing unwanted components of the above multiplying processes, an equalizer connected to respective outputs of the filters, a carrier phase corrector connected to respective outputs of the equalizer, and a voice sample data to analog converter which produces a voice signal output.

The transmitter circuitry apparatus also includes an energy detector connected to the voice signal input, and a digital transmitter sequencer and controller connected to an output of the energy detector and having a voice request input and a ready output. The digital transmitter sequencer and controller function to switch operation of the circuit from the aforementioned communication of an analog or other voice signal over two independent paths on a communication channel to an operation for training or retraining the system parameters such as by equalizing the transmitter and receiver. The switching comprises the use of a digital to discrete level converter connected to respective outputs of the digital transmitter sequencer and controller. The digital to discrete level converter produces the training or retraining signals.

The receiver circuitry also contains a data detector connected to respective outputs of the carrier phase corrector for producing a feedback signal to the carrier phase correcter, and a digital receiver sequencer and controller which has an output from the data detector and sends a signal indicative of whether a voice should be on or off to the voice sample data to analog converter. A timing recovery module is also provided and is connected to respective outputs of the pulse amplitude modulation filters.

DETAILED DESCRIPTION OF THE INVENTION

Figure 1:
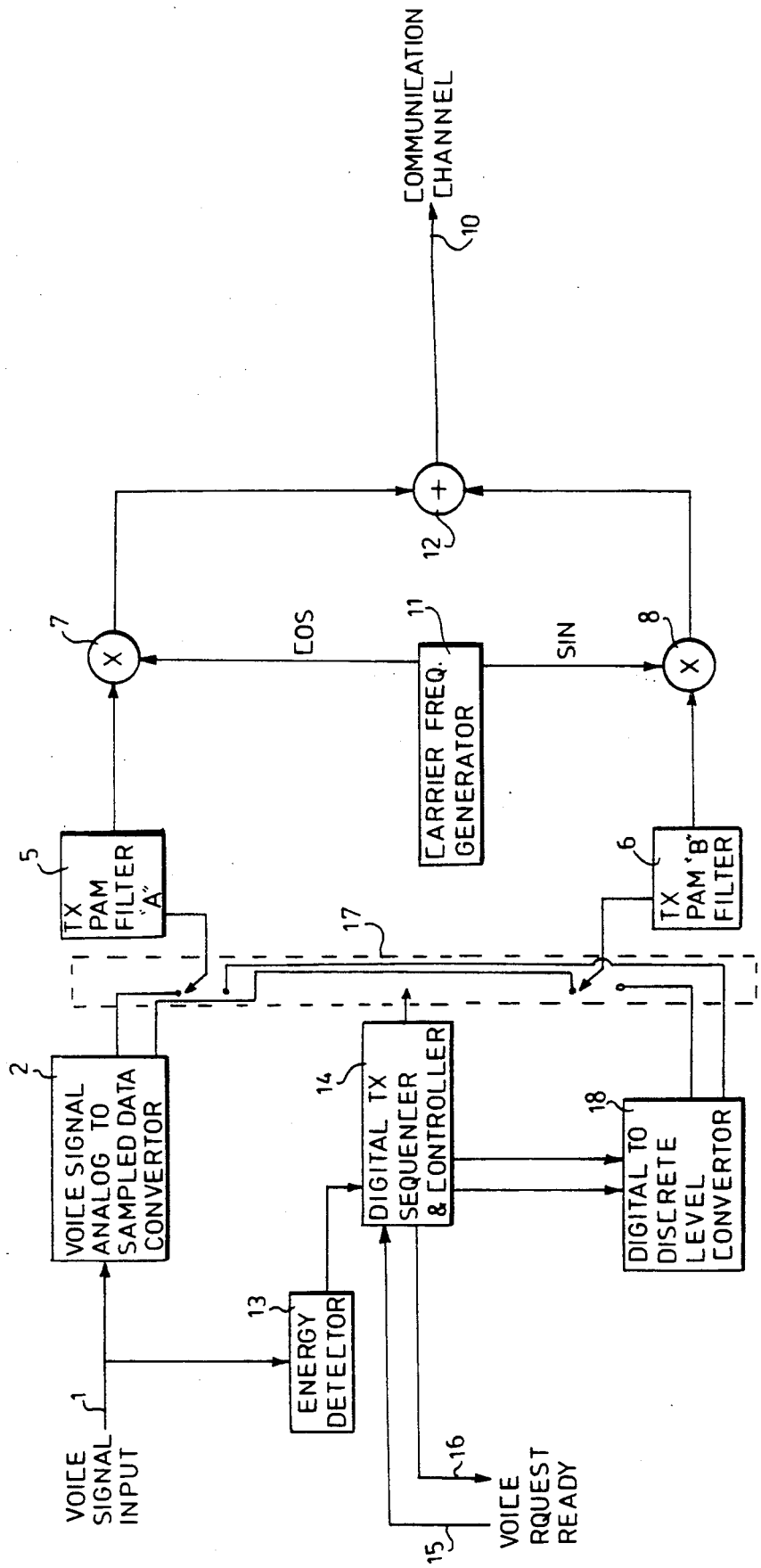
FIG. 1 is a block diagram of the transmitter circuitry of the present invention.

As shown in FIG. 1, an analog signal such as voice signal 1 is conveyed to the modem transmitter circuitry of the present invention. Signal 1 is conveyed to voice signal analog to sample data converter 2. The input voice signal 1 is assumed to be a normal voice signal such as would be produced by a carbon or dynamic microphone with or without distortions which may be produced in a telephone network, such as by compansion or Pulse Code Modulation (PCM). In the present invention Signal 1 is sampled to provide dual 2400 symbols per second representation (4800 total symbols per second) and converted into two series of 2400 symbol per second continuously variable amplitude pulses. A converter 2 may utilize several different approaches including energy dependent buffering, variable rate buffering, predictive techniques such as linear predictive coding, or frequency band reduction techniques. In the present example converter 2 converts the voice signal 1 into pairs of continuously variable amplitude output pulses at 2400 pulses per second.

The continuously variable amplitude pulse output signals from converter 2 are respectively conveyed to filters 5 and 6. The respective outputs of these filters are conveyed to mixers 7 and 8 where they are combined with inputs from carrier frequency generator 11 which are offset 90 degrees with respect to each other. The mixer outputs are each conveyed to adder 12 and thereupon transmitted over communications channel 10.

The transmitter circuitry of FIG. 1 further comprises an energy detector 13 which determines if voice signal B exceeds a predetermined threshold and so indicates to a digital transmitter sequencer and controller 14. The digital transmitter sequencer and controller also has a voice request input and a ready output. If the situation arises where it is desired to send training or retraining signals instead of data over the communications channels, digital sequencer and controller 14 sends an output to switch 17 which switches the input of respective filters 5 and 6 from the voice signal analog to sample data converter 2 to respective inputs from digital to discrete level converter 18 which itself has inputs from digital transmitter sequencer and control of 14.

Figure 2:
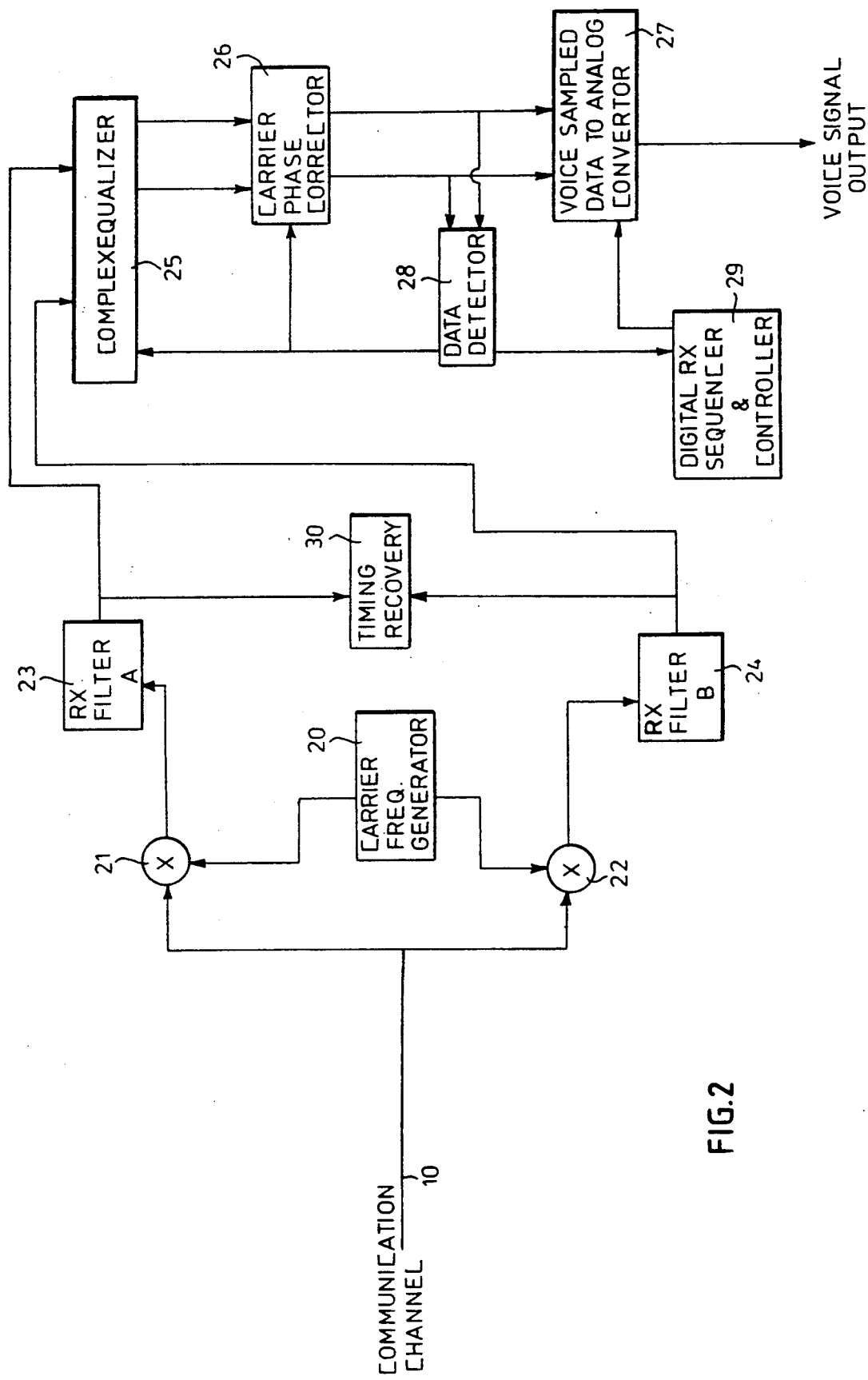
FIG. 2 is a block diagram of the receiver circuitry of the present invention.

As shown in FIG. 2, at the receiver end of communications channel 10 the continuously variable amplitude quadrature amplified modulated dual signals are conveyed to mixers 21 and 22. Carrier frequency generator 20 produces the signals such that they differ in phase by 90 degrees and conveys them respectively to mixers 21 and 22 where they are multiplied with the input signal from communication channel. The respective signals are thereupon conveyed to receiver PAM filters 23 and 24. The respective signals are then conveyed to complex equalizer 25 which has a pair of respective output to carrier phase corrector 26. The dual outputs from phase corrector 26 are conveyed to sample data to analog converter 27 which produces a single voice signal output.

The receiver circuitry shown in FIG. 2 also comprises a data detector 28 which receives the respective output signals from carrier phase corrector 26 and which provides feedback signals to carrier phase corrector 26 and complex equalizer 25. The circuitry also comprises a digital receiver sequencer and controller 29 which provides voice ON/OFF signals to converter 27. The receiver circuitry further comprises a timing recovery module 30 which has respective input from the filters 23 and 24.

Figure 3:
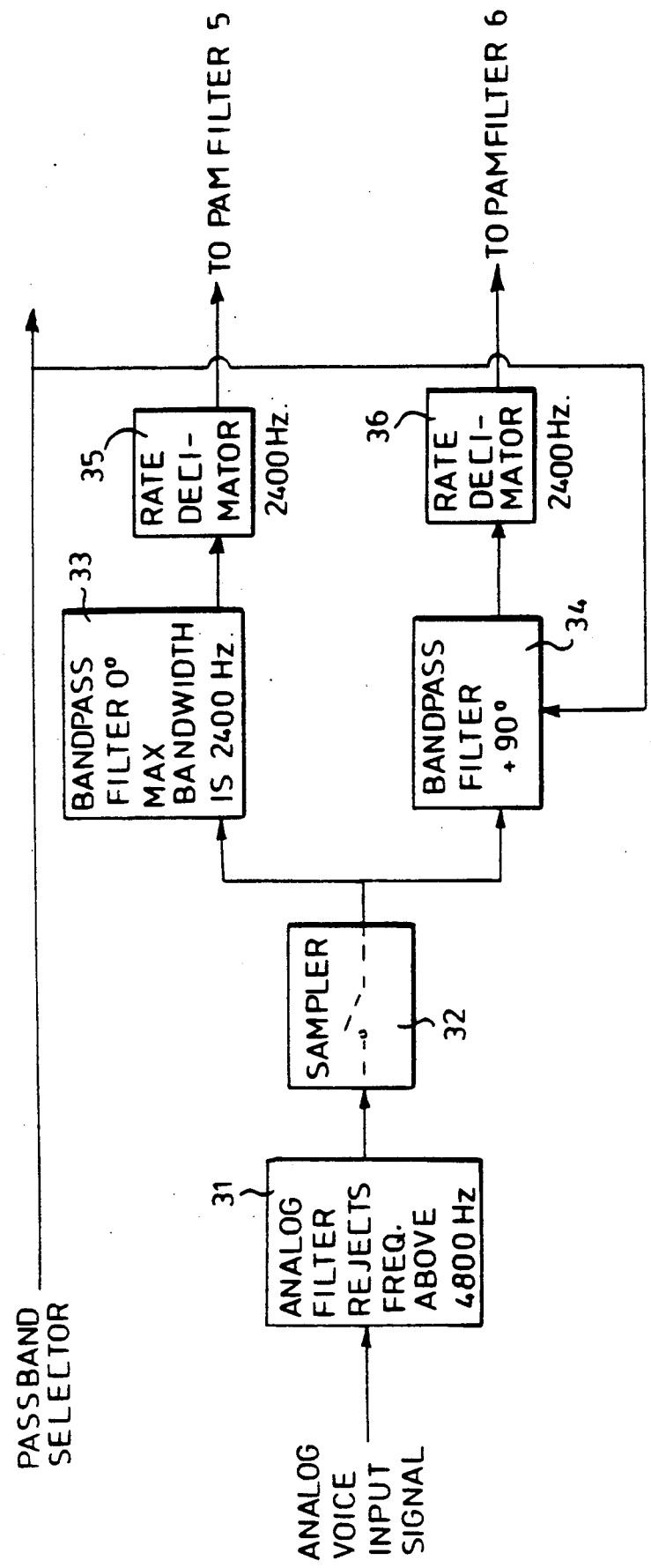
FIG. 3 is a block diagram of the analog to sample data converter of the present invention.
Figure 5:
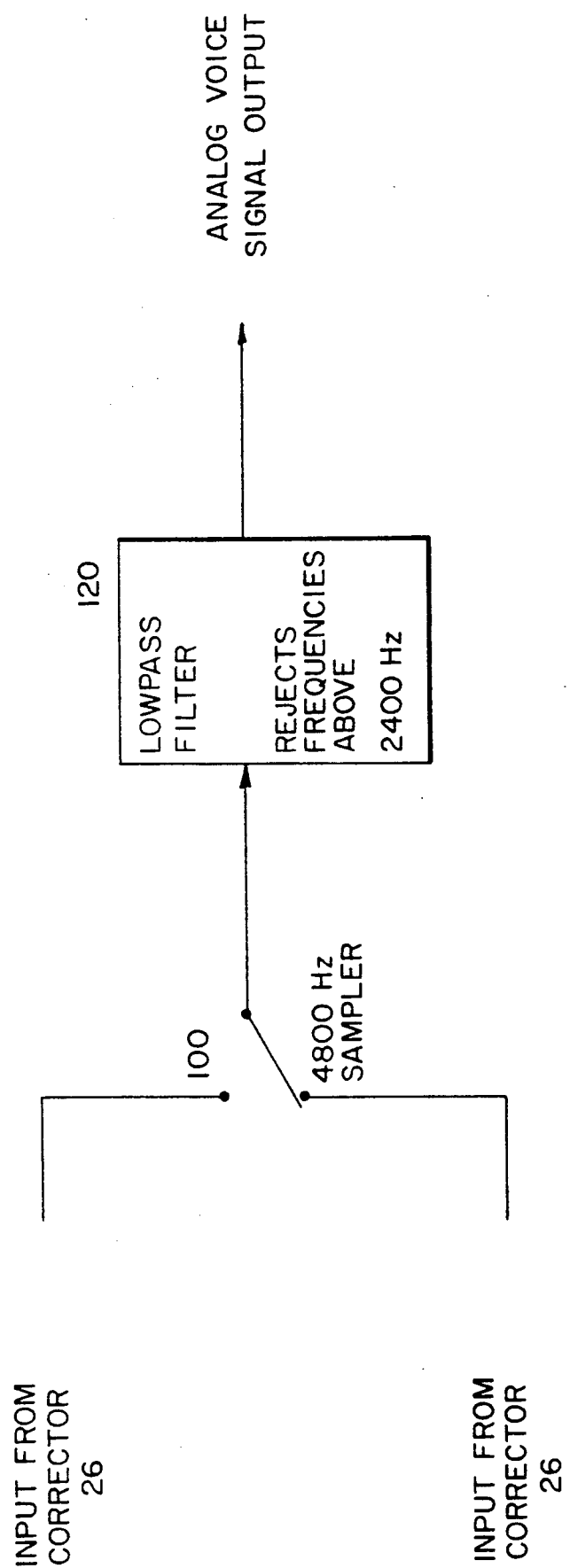
FIG. 5 discloses an example of circuitry used for the voice sample data to analog converter.

An example of circuitry which can be used for the analog to sample data converter 2 is shown in FIG. 3. As shown therein, the analog voice Signal 1 passes through lowpass filter 31 which removes all components above 2400 Hz. The output of filter 31 is sampled at 2400 Hz by sampler 34 and the output of filter 31 is delayed by the time delay 32 and sampled by sampler 33 which is time synchronous to sampler 34. The outputs of samplers 33 and 34 are conveyed to filters 5 and 6 via rate decimators 35, 36, respectively. An example of circuitry used for the voice sampled data to analog convertor 27 is shown in FIG. 5.

The voice sample data to analog converter 27 has respective inputs from corrector 26 which are conveyed to 4800 Hz sampler 100 which converts the two inputs into a single 4800 Hz sampled data signal. The output of the sampler is conveyed to lowpass filter 120 which removes all frequency components above 2400 Hz. The lowpass filter output is suitable for conversion into a sound signal by devices such as telephone earphones.

Figure 4:
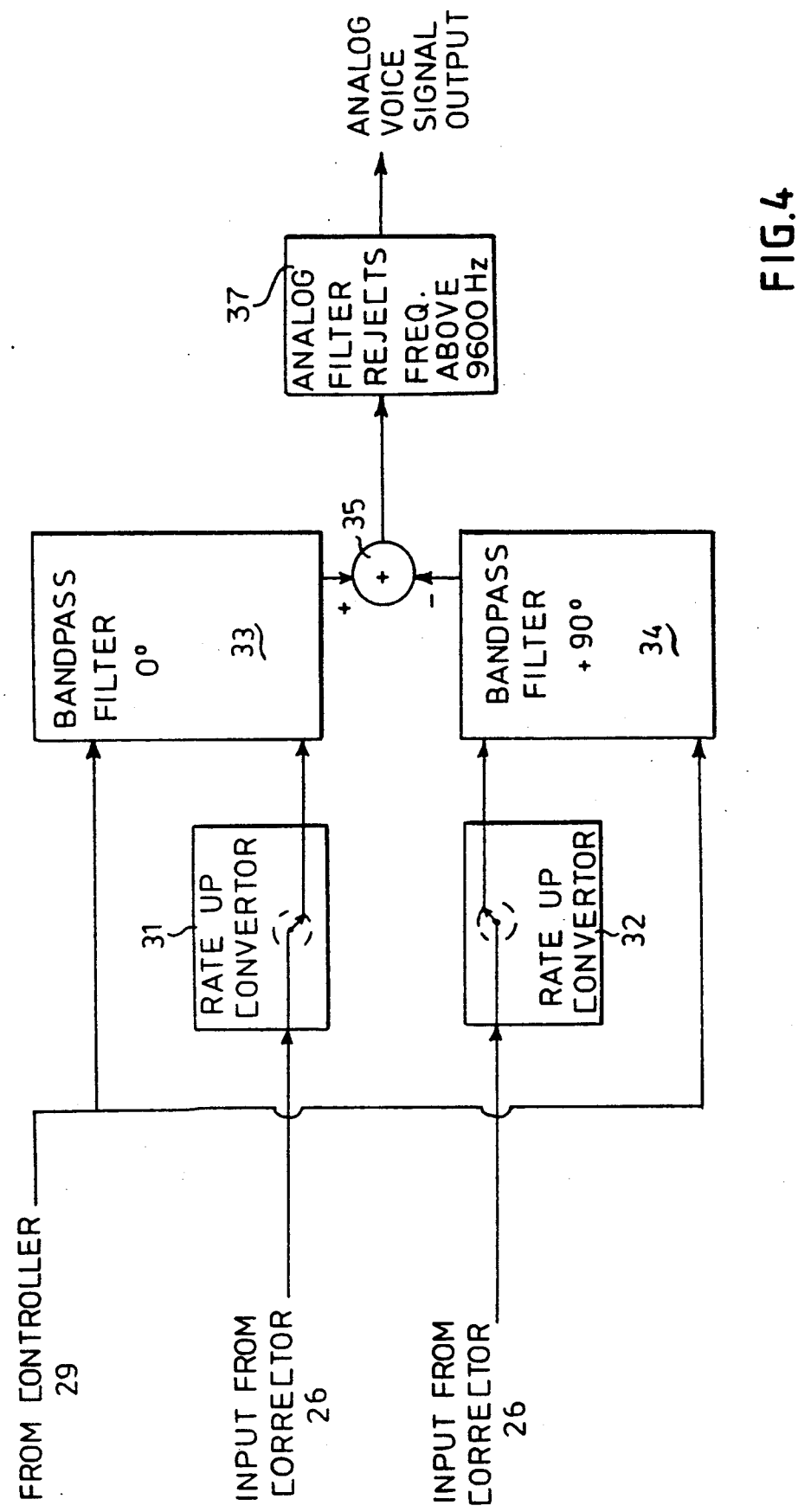
FIG. 4 is a block diagram of the sample data to analog converter of the present invention.

As seen from FIG. 4, voice sampled data to analog converter 27 includes a low pass filter 37 to reject frequencies above 9600 Hz from the analog voice output.

The system shown in FIGS. 1–5 operates in the following manner. First, communication paths are established by transmitting a sequence of known discrete level symbols from converter 18. The receiver sequencer 29 recognizes this initialization sequence and adapts all receiver functions in the same manner as in a data modem. Sequencer 29 further synchronizes convertors 2 and 27.

Upon completion of the fixed sequence duration, the transmitter controller 14 provides a ready indication and awaits a voice request. Similarly, the receiver awaits reception of a voice signal indication.

Upon a voice request indication and a voice energy indication from energy detector 13, the controller 14 will cause converter 18 to transmit a special short sequence of symbols for the purpose of indicating impending continuously variable level communication to the receiver. After this sequence, the converted voice signal symbol pairs are transmitted from converter 2.

Upon loss of voice energy, another sequence of discrete level symbols is transmitted to provide such indication to the receiver and allow adaptive updates of receiver functions such as the equalizer 25.

The alternation of continuous voice legal symbol pairs and discrete level symbol pairs continues through the voice conversation.

Other methods for interspersing continuous and discrete levels for the purposes of providing faster adaptive updating are contemplated, but are not addressed here.

It can be seen from the above that the division of a voice signal into two independent communication paths has obvious advantages for the security of a telephone conversation.

While only a preferred embodiment of the invention has been shown and described by way of illustration, many modifications and changes will occur to those skilled in the art. It is, therefore, to be understood that the appended claims are intended to cover all such modifications and changes as fall within the true spirit and scope of the invention.

What is claimed is:

1. A method for communicating an analog signal such as a voice signal in two independent communication paths over a single communication channel comprising the steps of:
   sampling said analog signal and converting it into two series of continuously variable amplitude pulses;
   mixing said two series of continuously variable amplitude pulses respectively with carrier frequency signals offset from each other 90°;
   adding said two series of continuously variable amplitude pulses;
   transmitting said added two series of continuously variable amplitude pulses over said single communication channel; and
   measuring the energy level of said analog signal and switching inputs to said communication channel to transmit discrete level symbols in lieu of said continuously variable amplitude pulses.

2. The method of claim 1 further comprising receiving said transmitted two series of continuously variable amplitude pulses, mixing them with respective 90° offset signals form a carrier frequency generator, and converting them to a single analog signal.

3. A system for communicating a single analog signal such as a voice signal in two totally independent communication paths over a single communication channel comprising:
   a first converter for converting said analog signal to two series of continuously variable amplitude pulses and having respective outputs for each of said series;
   a pair of filters for filtering said respective outputs;
   a first carrier frequency generator which generates two output carrier frequency signals offset from each other by 90°;
   a first pair of mixers each having an input from said carrier frequency generator an an input from one of said pair of filters;
   means for combining the outputs of said pair of mixers and transmitting them over said single communication channel, said combining means comprising an adder having an output connected to said communication channel;
   an energy detector, a digital transmitter sequencer and controller having an input from said energy detector, and a digital to discrete level converter having one or more inputs from said digital transmitter sequencer and controller and functioning under control of said digital transmitter sequencer and controller to transmit discrete level signals respectively through said pair of filters, said respective pair of mixers, and said combining means to said communication channel.

4. The system of claim 3 further comprising a switch connected to an output of said digital transmitter sequencer and controller and controlled thereby to switch said first converter or said digital to discrete level converter into direct connection with said pair of PAM filters.

5. The system of claim 4 further comprising a digital receiver sequencer and controller having an input from said data detector and functioning to convey outputs to said second converter which determine whether it produces said single analog signal output.

6. The system of claim 3 further comprising a second carrier frequency generator, a second pair of mixers for respectively combining said two series of continuously variable amplitude pulses after they are received from said communication channel with outputs from said second carrier frequency generator which are offset from each other by 90°, a complex equalizer connected to respective outputs of said second pair of mixers, a carrier phase corrector connected to respective outputs of said complex equalizer, and a second converter which converts respective outputs from said carrier phase corrector to a single analog signal and which outputs said single analog signal.

7. The system of claim 3 further comprising a data detector having direct inputs from said respective carrier phase corrector outputs and providing feedback inputs to said carrier phase corrector and said complex equalizer.

* * * * *